United States Patent Office 3,843,352
Patented Oct. 22, 1974

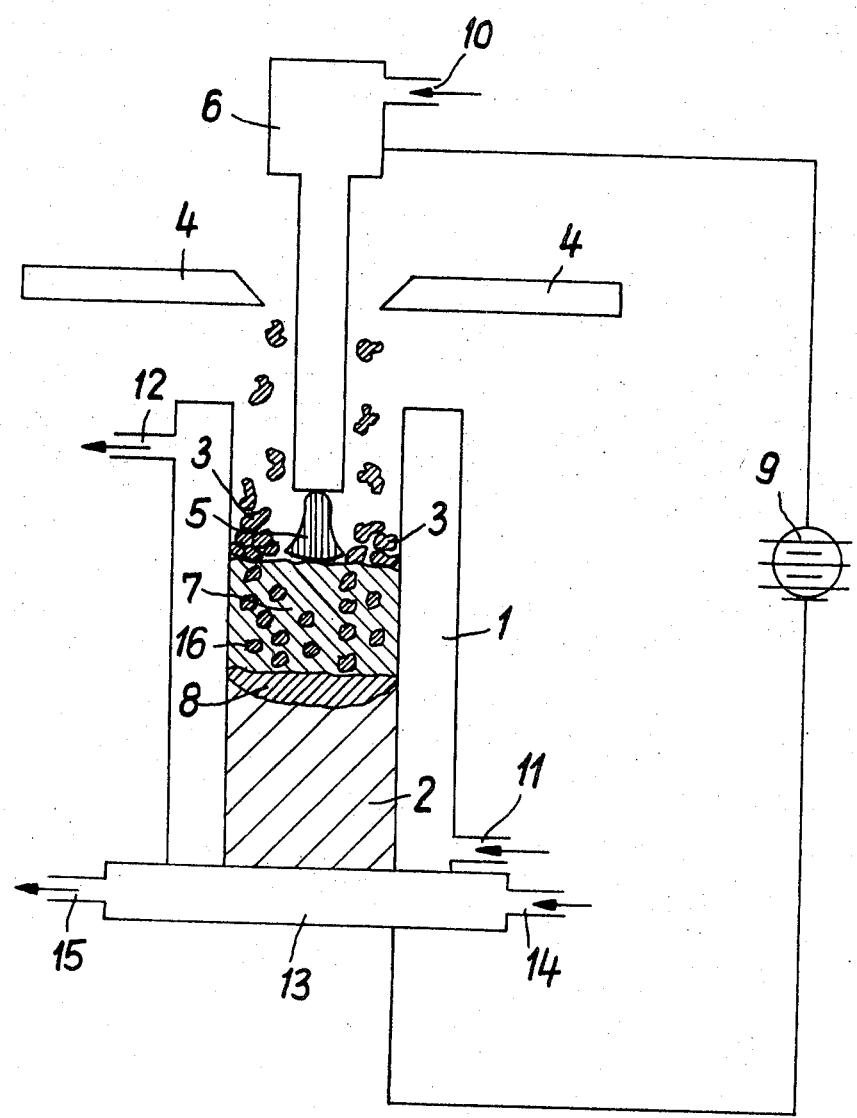

3,843,352
METHOD FOR MELTING SPONGE METAL USING GAS PLASMA IN A COOLED METAL CRUCIBLE
Klaus-Herbert Ulrich, Essen, Germany, assignor to Fried. Krupp Gesellschaft mit beschrankter Haftung, Essen, Germany
Filed Sept. 28, 1972, Ser. No. 293,031
Claims priority, application Germany, Oct. 4, 1971, P 21 49 407.5
Int. Cl. C22d 7/00
U.S. Cl. 75—10 R                3 Claims

ABSTRACT OF THE DISCLOSURE

A method for melting sponge metal in a metal crucible containing a sump region of molten metal covered by a molten slag, which sponge metal floats on the slag when in the solid state and sinks through the slag when in the molten state, including feeding the sponge metal in the solid state onto the slag, directing a plasma stream onto sponge metal on said slag for changing the solid sponge metal into molten droplets, and cooling said crucible for maintaining a continuously proceeding solidification of the lower surface of the sump region of molten metal.

BACKGROUND OF THE INVENTION

The present invention relates to a method for melting sponge metal using gas plasma in a cooled metal crucible. The gas plasma is usually inert and is produced electrically.

To an increasing degree in the area of metallurgical melting technology, sponge metal raw materials are being used as charge for melt down into ingots and similar basic products. It has been the practice to charge the raw material, for example sponge iron, to electrical arc furnaces in the form of granular sponge metal. In the case of reactive metals, such as titanium and zirconium, the sponge metal has been pressed to electrodes, which are then melted off in a vacuum arc furnace using a self-consuming electrode.

In the melting of sponge iron in electric arc furnaces, the refining process is made up of the process steps melting and refining, with the refining involving the transferring of the impurities from the molten metal into a slag. Then, the resulting steel is tapped into ladles and teemed into ingot molds.

In the case of working with reactive sponge metals according to the vacuum arc method, a slag can be dispensed with, since the impurities are removed by evaporation.

For the refining of reactive sponge metals without a slag, a device has been proposed in which an inert gas plasma is applied for remelting. The plasma burners which are used, operate with a transferred arc and consequently produce at the point of impingement on the melt such high temperatures that, as in the vacuum process, the impurities in the sponge are evaporated in this case also. In many cases, however, the impurities cannot be removed by evaporation; rather, they must be transferred into a slag.

Besides this application of a plasma burner, various other applications of plasma burners are described or referred to in United States Patent Application Serial No. 231,824, filed March 6th, 1972, by Klaus-Herbert Ulrich for a "Device for Melting Sponge Metal Using Inert Gas Plasmas" and in United States Patent Application Ser. No. 240,641, filed Apr. 3rd, 1972, by Herbert Ritter von Waclawiczek et al. for a "Method for Producing Steel."

SUMMARY OF THE INVENTION

An object of the present invention is to provide a method for making the technology of melting sponge metal with gas plasma applicable additionally for the case where impurities must be removed with a slag.

This as well as other objects which will become apparent in the discussion that follows are achieved, according to the present invention, by a method for melting sponge metal in a metal crucible containing a sump region of molten metal covered by a molten slag, which sponge metal floats on the slag when in the solid state and sinks through the slag when in the molten state, comprising feeding the sponge metal in the solid state onto the slag, directing a plasma stream onto sponge metal on the slag for changing the solid sponge metal into molten droplets, and cooling the crucible for maintaining a continuously proceeding solidification of the lower surface of the sump region of molten metal.

GENERAL ASPECTS OF THE INVENTION

According to the present invention, sponge metal, whose effective density is less than the density of a slag situated over a molten metal sump region, is fed onto the slag and melted by the heat given off from a hot, inert, electrically generated gas plasma stream between an electrode and the surface of the slag. The sponge metal forms droplets, which fall through the molten slag layer and into the molten metal sump region. By cooling of the metal crucible containing the sump region, there is a progressive solidification to form an ingot of continually increasing length.

BRIEF DESCRIPTION OF THE DRAWING

The sole figure of the drawing is an elevational, cross-sectional, partly schematic view of an apparatus carrying out the method of the invention.

DESCRIPTION OF THE PREFERRED EMBODIMENTS

Preferably, the method of the present invention is carried out in a cooled cylindrical or slightly conical (wide end down) ingot mold, in whose lower portion a solid ingot is produced as the melting is carried out.

The technology of the slagging used in the present invention is known per se. It is used in the electroslag remelting process. The method of the present invention provides the advantage, when compared to the electroslag remelting process, that the premelted electrodes used in that process can be dispensed with and a cheap and still strongly contaminated, granular sponge metal, for example sponge iron, can be used instead. In contrast to the situation in the conventional electric arc furnace method, such sponge iron can be refined according to the present invention in a single operation, continuously into an ingot ready for, for example, rolling.

A further significant advantage of the present invention is that the slag temperature, in the metallurgical system determined by the slag temperature, can be influenced independently of the melting temperature of the sponge metal being melted. By decreasing the charging rate of the sponge metal, it is even possible to obtain an increase in the slag temperature to above the melting point (2600° C.) of pure lime. In contrast, the slag temperature in electroslag remelting cannot rise so far over the melting point of the previously melted electrode, which penetrates into the slag; in the case of iron alloys, this means 1800 to 2000° C., so that the slag for the electroslag remelting process must have a very low melting temperature. The calcium fluoride used to lower slag melting temperature to a range acceptable for electroslag remelting is disadvantageous, because it is relatively costly and leads to fluorine emissions. In the present invention, such temperature lowering additives can be abandoned. And, the now possible increasing of slag temperature can, moreover, create conditions giving an improvement in the refining action of the slag. Above all, the important matter of sulfur removal from the metal can be improved.

Electroslag remelting processes are described in *Problemy Projektowe Hutnictwa*, October, 1969, pages 301 to 308 and in *Steel In The U.S.S.R.*, January, 1971, pages 40 to 42.

With reference to the sole figure of the drawing, the ideas of the present invention are illustrated in an apparatus resembling in part the type used in the electroslag remelting process. Contained in a cooled metal crucible 1 is an ingot 2 of steel, which has been formed by the melting of an impure, granular sponge iron 3. The particles of sponge iron are charged to the metal crucible through feed tubes 4. The heat required for melting is provided by a plasma flame or stream 5, which is produced by plasma burner 6. Burner 6 utilizes the transferred arc principle. The naturally porous sponge metal granules float on the surface of the slag 7 where they are melted by the action of plasma flame 5. The resulting drops 16 of molten sponge metal have a higher density than the slag, due to their greater compactness achieved from passing from the solid, naturally porous state into the molten, liquid state, and consequently the drops 16 fall down through the slag 7 and collect as a sump region 8 of molten metal on the upper surface of ingot 2. The impurities of the sponge metal, for example sulfur and phosphorus, are taken up by the slag 7 as the drops 16 pass through, as in the case of electroslag remelting; here, however, a higher slag temperature is possible for accelerating the extraction of impurities into the slag from the molten drops of metal.

Electrical power source 9 supplies the energy needed for operating plasma burner 6. Gas for forming the plasma enters the burner through connection 10.

Cooling water flows through the walls of the crucible 1 serving as the ingot mold. Water enters at connection 11 and leaves at connection 12. The floor 13 of the crucible is likewise watercooled, with water flowing in at connection 14 and out at connection 15.

According to the invention, the plasma burner is operated with an inert gas, for example argon or nitrogen, for forming the plasma. As required, reducing or oxidizing gas can be mixed in small amounts into the inert gas. Examples of possible additive gases are hydrogen, carbon monoxide, methane, and even carbon dioxide or air. Reducing gases are appropriate when, for example, a small amount of iron oxide is still present in the sponge iron and must be removed in order to get the oxygen content in the ingot into the limits set by demands on quality. An adding of carbon monoxide or methane to the gas for the plasma can also raise the carbon content of the ingot. The adding of oxidizing gases is necessary when oxygen contents lying above the oxygen content of the sponge metal are required in the ingot.

The method of the present invention can be carried out with a transferred arc plasma burner in a metal mold which is closed at its bottom end. In this case, the plasma burner is continually raised during the melting, as a function of the growth of the ingot. However, the type of mold used in continuous casting can also be applied in the present invention; the bottom end is open and the ingot is lowered out of the mold as a function of the melting rate. Appropriate technology is described and referred to in the above referenced Application Serial No. 231,824.

It is especially advantageous to run the gas used for forming the plasma in a closed circuit.

It will be understood that the above description of the present invention is susceptible to various modifications, changes and adaptations, and the same are intended to be comprehended within the meaning and range of equivalents of the appended claims.

I claim:

1. A method for melting sponge metal and removing impurities from it comprising: providing a metal crucible containing a sump region of molten metal covered by a molten slag; feeding sponge metal in the solid state, and having an effective density less than the density of the slag, onto said slag so that the solid state sponge metal floats on said slag; directing a plasma stream onto the sponge metal on said slag to change the solid sponge metal into molten droplets which fall through the molten slag into the molten metal sump region, with the slag removing impurities from the droplets as they pass through the slag; and cooling said crucible to maintain a continuous solidification of the lower surface of the sump region of molten metal.

2. A method as claim in claim 1, said plasma stream being inert.

3. A method as claimed in claim 1, said sponge metal being iron.

References Cited
UNITED STATES PATENTS

| | | | |
|---|---|---|---|
| 3,347,766 | 10/1967 | Death | 75—10 |
| 3,627,293 | 12/1971 | Sperner | 75—10 |
| 3,496,280 | 2/1970 | Dukelow | 75—10 |
| 3,627,293 | 7/1970 | Voskoboinikov | 75—10 |
| 3,140,168 | 7/1964 | Halley | 75—26 |

OTHER REFERENCES

Duckworth & Hoyle, Electroslag Refining, pp. 129–30 (1969).

L. DEWAYNE RUTLEDGE, Primary Examiner

P.D. ROSENBERG, Assistant Examiner

U.S. Cl. X.R.

75—65 EB